United States Patent [19]

Lamar

[11] Patent Number: 4,935,691
[45] Date of Patent: Jun. 19, 1990

[54] PHASE SWITCHED POWER CONTROLLER

[75] Inventor: Luis A. Lamar, Miramar, Fla.

[73] Assignee: Dodge-Romig Research & Development, Incorporated, Miami, Fla.

[21] Appl. No.: 378,855

[22] Filed: Jul. 12, 1989

[51] Int. Cl.⁵ .............................................. G05F 5/02
[52] U.S. Cl. ................................. 323/323; 323/237; 323/300; 323/320
[58] Field of Search ............... 323/237, 241, 244, 300, 323/320, 322, 323

[56] References Cited

U.S. PATENT DOCUMENTS

| | | | |
|---|---|---|---|
| 3,447,057 | 5/1969 | Brown et al. | 323/905 |
| 3,593,112 | 7/1971 | Coats et al. | 323/326 |
| 3,646,423 | 2/1972 | Tatematsu et al. | 323/237 |
| 3,715,651 | 2/1973 | Ott | 323/244 |
| 3,818,320 | 6/1974 | Schindler | 323/244 |
| 4,047,096 | 9/1977 | Madewell | 323/300 |
| 4,311,955 | 1/1982 | Murakami | 323/322 |
| 4,311,956 | 1/1982 | Tolmie | 323/326 |
| 4,337,430 | 6/1982 | Flego | 323/323 |
| 4,370,730 | 4/1983 | Morton | 323/237 |
| 4,546,424 | 10/1985 | Nolan | 363/87 |
| 4,549,116 | 10/1985 | Andrews | 307/146 |
| 4,574,230 | 3/1986 | Masaki | 323/242 |
| 4,623,824 | 11/1986 | Scdari et al. | 323/242 |
| 4,779,038 | 10/1988 | Eckerfeld | 323/241 |

Primary Examiner—Patrick R. Salce
Assistant Examiner—Jeffrey Sterrett
Attorney, Agent, or Firm—Steele, Gould & Fried

[57] ABSTRACT

A phase switched power controller connects a load to a alternating current source for a proportion of each half cycle selected by the user. A first full wave rectifier is connected to the voltage source and produces an unfiltered full wave rectified output signal varying between zero and a predetermined peak. A low pass filtered full wave rectified signal is preferably obtained from a second full wave rectifier, the filtered voltage and unfiltered voltage being applied as inputs to a voltage comparator, the output of which triggers a timer. The timer determines the phase delay until a further pulse is triggered for activating a triac, applying power to the load during the remainder of each half cycle.

17 Claims, 3 Drawing Sheets

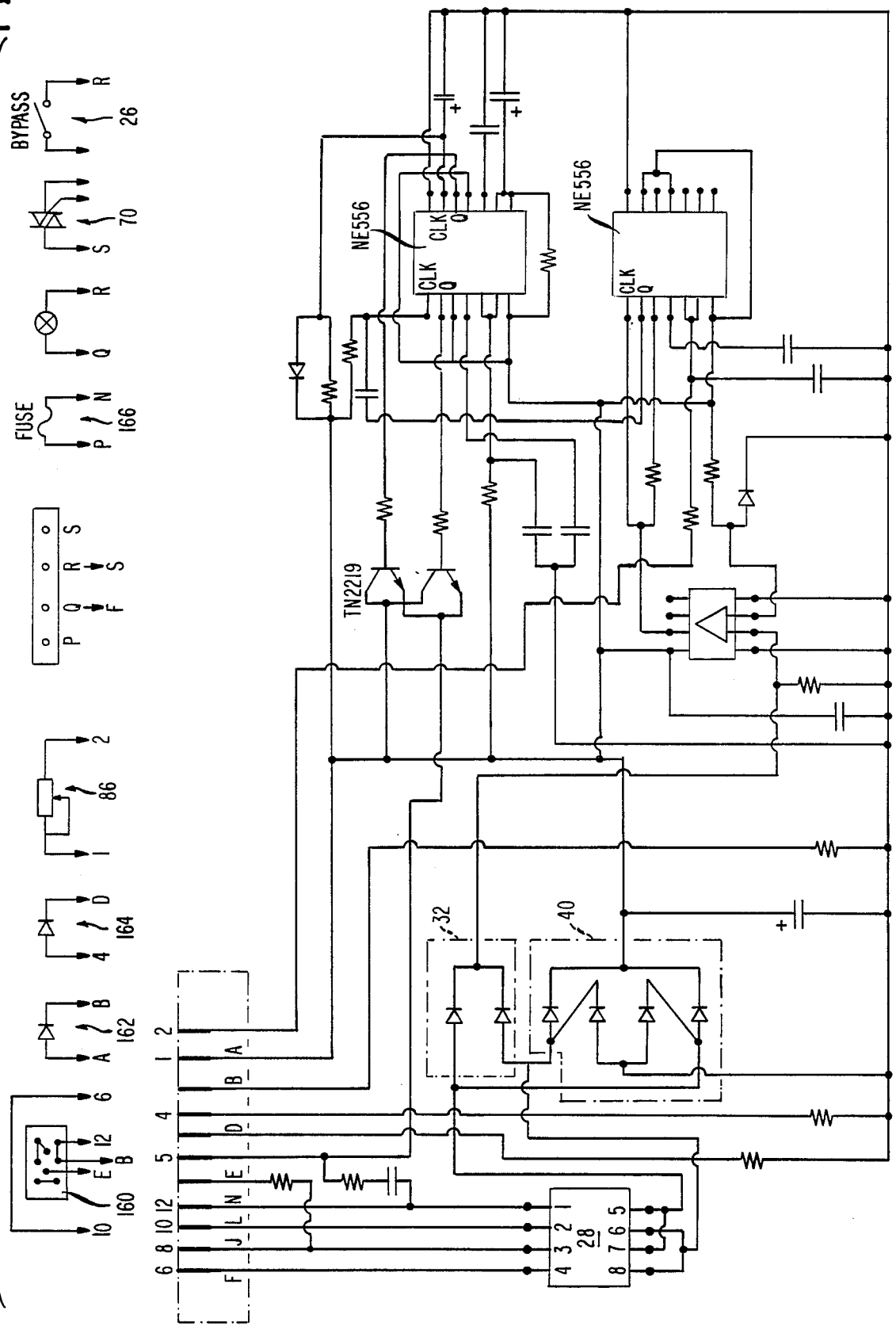

PHASE SWITCHED POWER CONTROLLER

BACKGROUND OF THE INVENTION

1. Field of the Invention

This invention relates to the field of AC power controllers and in particular to a phase-triggered control operable to apply power to a load during a controllable portion of each power half-cycle.

2. Prior Art

Power controllers have been proposed wherein the point of zero crossing in an AC signal is sensed, and a timing means triggered at the zero crossing is employed to turn on a thyristor such as a triac, for applying the supply voltage to a load during only a certain phase increment of each half cycle. Examples of such controls are disclosed, for example, in U.S. Pat. No. 4,311,956-Tolmie Jr., and U.S. Pat. No. 3,593,112-Coats et al. The objective is the same in each case, namely to determine by preferably-variable means the precise point at which the triac will be turned on, applying current to the load at substantially the full supply voltage until the next zero crossing when, unless again triggered, the change in voltage polarity will turn the triac off. In this sense, "on" and "off" denote the conducting and non-conducting states of the triac, respectively.

The Tolmie reference employs two comparators, one for sensing the point of zero crossing on the supply voltage, and the other adjustably determining the phase delay until triggering of the triac. A series regulated power supply is provided to obtain a fixed DC voltage to power the comparators, i.e., high gain operational amplifiers. This accurate voltage supply is also used to provide an accurate voltage reference for detecting zero crossings in a full wave rectified signal derived from the power line.

The patent to Coats et al discloses a controller which can be operated by computer outputs and the like, using timing elements including unijunction and field-effect transistors. The objective is detecting zero crossings in the supply power, and timing the interval to a point at which a triac will be turned on. Coats' controller, like Tolmie's controller, is a complicated and expensive device which requires precise DC voltage regulation for its respective elements. In Coats, a series of zener diodes are provided for accurately regulating the supply voltage to the timing elements. A series regulator is used in Tolmie.

Precise DC voltage control is normally considered necessary for supplying integrated circuit timers, unijunction transistor timers and the like. Without good supply voltage regulation, accurate results are normally not expected. Supply voltage is typically regulated using a series power transistor with a zener diode reference, directly or indirectly controlling the conductance of the series transistor. In addition to the cost of these components, a good series regulator generates some overhead in terms of heat sinks and the like, which would be avoided if this were routinely possible.

Power control devices employing triacs are very useful for AC switching purposes, and are sometimes employed as so-called solid state relays. Inasmuch as the switching is normally accomplished at a zero crossing, inductive surges and the like are minimized. However, in a phase-delay switching apparatus as involved in the foregoing references and in this application, the voltage applied to the load by the triac rises quickly at the point of triggering, to substantially the full supply voltage level at the time of triggering. Where the switching occurs prior to the peak supply voltage level, the load experiences a short delay at zero voltage between half cycles, followed by a sudden rise to the voltage level at a predetermined, adjustable time. Unless the phase delay is long enough to pass the peak voltage, the result of the control is that the RMS power applied to the load is adjustable, while the peak voltage of the supply is not reduced in the power applied to the load. This renders the control especially applicable for adjusting lighting systems, for example with florescent bulbs, wherein it is desirable that the supply voltage reach the peak voltage, at least for a time during a half cycle. A power control for an incandescent lamp is disclosed in U.S. Pat. No. 4,549,116-Andrews. Thyristor controls with triacs or SCRs are also useful in connection with other types of devices, for example, electric motors. As SCR-triggered control is disclosed in U.S. Pat. No. 3,447,057-Brown et al. Similarly, thyristor controls can be used at frequencies or voltage levels other than that of the conventional utility or generation driven power lines. U.S. Pat. No. 4,623,824-Scolari et al, for example, discloses an SCR-switched power control for a DC/AC inverter and voltage multiplier.

The present invention minimizes the number of components and the required precision of the components. A comparator senses zero crossings by comparing a full wave rectified periodic signal with a low-pass filtered full wave rectified signal, the comparator also being powered by this filtered signal, notwithstanding the lack of series regulation. Timers having RC timing elements adjustably determine the phase delay and provide a pulse for triggering the triac during each half cycle. The timers are also powered by the filtered full wave rectified signal. Preferably, a precision potentiometer is employed in the RC network for the timer determining the phase delay. This potentiometer may be a multi-turn pot with a numeric indicator for precise control. The apparatus is especially applicable to florescent lighting control and can be packaged as a unit operable to control one or more circuits.

SUMMARY OF THE INVENTION

It is an object of the invention to provide a dependable low cost AC power controller for phase delayed switching of AC power.

It is a further object of the invention to provide the maximum precision and adjustability in a phase delay power controller while at the same time avoiding the cost and precision needs of series regulators and voltage reference diodes.

It is a further object of the invention to provide a low cost precision power control which is robust and durable enough for general commercial and domestic use, preferably for mounting as an adjunct to the power circuit breaker box, and wired to lighting circuits throughout an establishment.

These and other objects are accomplished by a phase switched power controller which connects a load to an alternating current source for a controllable proportion of each half cycle, as selected by the user. A first full wave rectifier is connected to the voltage source and produces an unfiltered full wave rectified output signal varying between zero and a predetermined peak. A low pass filtered full wave rectified signal is preferably obtained from a second full wave rectifier, the filtered voltage and unfiltered voltage being applied as inputs to a voltage comparator, the output of which triggers a timer. The timer determines the phase delay until a further pulse is triggered for activating a triac, applying power to the load during the remainder of each half cycle.

BRIEF DESCRIPTION OF THE DRAWINGS

There are shown in the drawings the embodiments that are presently preferred, it should be understood, however, that the invention is capable of embodiment in other groupings and configurations, in accordance with the disclosure and definition of the invention. In the drawings.

FIG. 8 is a detailed schematic, showing particular circuit elements.

DETAILED DESCRIPTION OF THE PREFERRED EMBODIMENTS

Figure 1:
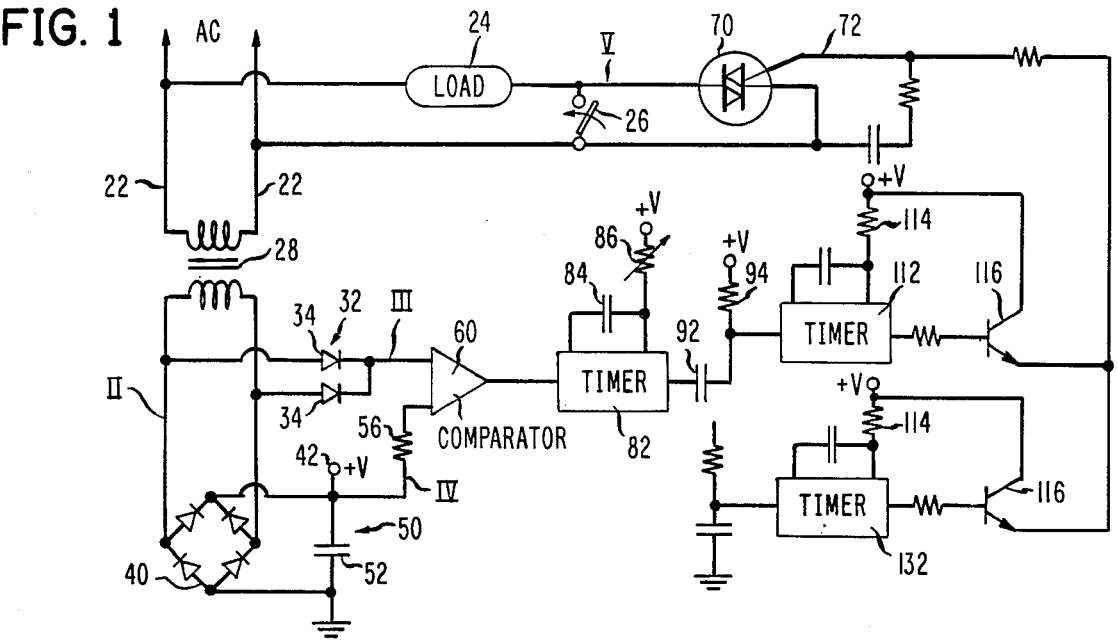
FIG. 1 is a schematic diagram of a power controller according to the invention.

FIG. 1 is a schematic illustration of a power controller according to the invention. Alternating current power along supply lines 22 is to be applied to load 24 during an adjustable portion of each half cycle on the power lines 22. This is accomplished by timing the triggering of a thyristor, for example, triac 70, which is in series with load 24 and connected across the AC supply lines 22. A bypass switch 26 is connected in parallel with triac 70, such that full power can be applied to load 24 when desired, bridging the control means.

Figure 9:
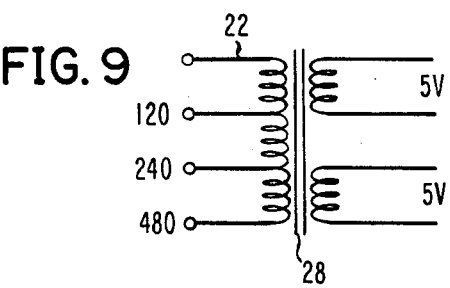
FIG. 9 is a schematic diagram showing a switch and transformer configuration according to the invention.
Figure 10:
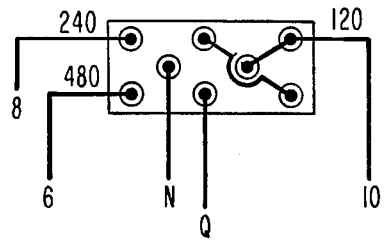
FIG. 10 is a schematic diagram showing a switch means for selecting among the windings of the transformer of FIG. 9.

Transformer 28 steps down the voltage supplied on lines 22 to levels appropriate for integrated circuit components, for example, 5 to 12 volts, etc. The voltage on the supply side at lines 22 can be any appropriate voltage for load 24, for example, 110, 220, 477 (for lighting circuits), or the like. Similarly, the frequency of the power can vary, for example 50, 60 or 440 hertz. Preferably, as shown in FIGS. 9 and 10, a convenient switch or jumper panel is provided to enable the installer to connect the supply side of the transformer 28 to any of the standard supply boltages, the transformer having windings form 120, 240 or 480 VAC, for example. Other available voltages and frequencies can be used as well.

Figure 2:
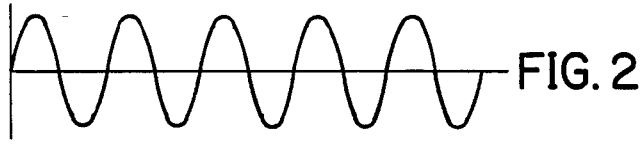
FIGS. 2-5 are timing graphs showing voltage or current levels at points II-V in FIG. 1.
Figure 3:

The voltage level on either side of transformer 28 is a sine wave, as shown in FIG. 2. On the secondary side of transformer 28, a full wave rectifier 32 converts the sine wave voltage into a full wave rectified voltage, as shown in FIG. 3. Rectifier 32 is provided by diodes 34, one or the other of which conducts during positive and negative excursions of the power, respectively. Transformer 28 can be a center-tapped transformer on the secondary side.

Figure 4:
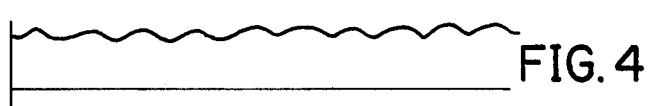

The full wave rectified signal "III" is applied to one input of comparator 60. Comparator 60 is a high gain operational amplifier. Whenever the voltage at the non-inverting input exceeds the voltage at the inverting input, the output of comparator 60 will be high. When the voltage at the inverting input exceeds the voltage at the non-inverting input, then the comparator output will change state. Comparator 60 is powered by a full wave rectified and filtered voltage, for example, the filtered output 42 of a full wave bridge rectifier 40, generally designated as "+V". A low pass filter 50 is defined by parallel storage capacitor 52, together with the series resistance of the diodes in the bridge rectifier 40. An additional series resistor can be included if desired between bridge rectifier 40 and DC voltage supply 42 to lower the low pass frequency. The DC voltage at point 42, designated as "IV", is substantially a DC signal, but also has substantial ripple, as shown in FIG. 4, due to the lack of a series regulator. The voltage at the input to the comparator is reduced substantially by series resistance 56, but still has a good bit of ripple. Nevertheless, whenever the full wave rectified signal (FIG. 3) crosses the reduced supply voltage (FIG. 4) used as a reference input, the output of comparator 60 will change state, i.e., during every half cycle. Resistor 56, setting the level of the second input to comparator 60, is large enough that the DC level at the input to the comparator is very low, for example, 0.8-1.0 V or just low enough to accommodate the forward biased voltage drop across diodes 34. In this manner, comparator 60 will produce a square wave pulse substantially corresponding to the zero crossings in the AC signal.

The output of comparator 60 is connected to the trigger input of timer 82. Timer 82 is a standard integrated circuit timer, for example one of two timers on dual timer model NE556, marketed by Texas Instruments. When triggered, the timer 82 produces a pulse output whose width is determined by an RC network connected thereto. Capacitor 84 and potentiometer 86 are connected to the timing inputs to timer 82, whereby adjusting potentiometer 86 sets the pulse length of the output of timer 82. The values of capacitor 84 and resistor 86 are set such that timer 82 will time out at a selected point following the zero crossing as detected by comparator 60.

The output of timer 82 is differentiated by series capacitor 92, i.e., the low going transistor on the output of timer 82 produces a low going pulse on the input to timer 112. The normal level of the input at timer 112 is pulled up by resistor 94 such that the input to timer 112 is normally high, but a low going pulse occurs when timer 82 times out. Timer 112 is then triggered. Timer 112 has a shorter pulse width, determined by an RC network 114 thereon. The output of timer 112 is a high going pulse which causes drive transistor 116 to conduct, thereby placing a pulse on gate 72 to triac 70 and causing the triac to begin conducting. Triac 70 continues to conduct until the next zero crossing, applying to load 24 a voltage substantially equal to the voltage across lines 22 on the AC supply.

A further timer 132 can be provided, having an integrating input rather than a differentiating input as does timer 112. In this case, the input RC network to timer 132 will further delay the output pulse to the associated drive transistor 116. The delay will be equal to the time required for the input to timer 132 to rise above its logical threshold, as the parallel capacitor on the input charges through the series resistor.

Figure 5:
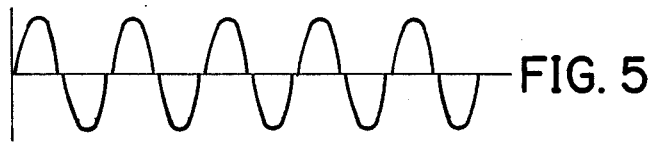

Assuming the delay set by the RC timing network of timer 82 is less than the delay between a zero crossing and the peak, the power applied to load 24 will be substantially as shown in FIG. 5. A delay during which the voltage is zero occurs after each zero crossing, until triac 70 is triggered via a pulse from timer 112, occurring at a time defined by timer 82. Accordingly, the peak voltage is equal to the peak voltage at the input, but the RMS value of the power supply to load 24 is less than would be available at the power control was bypassed, for example, by switch 26.

Figure 7:
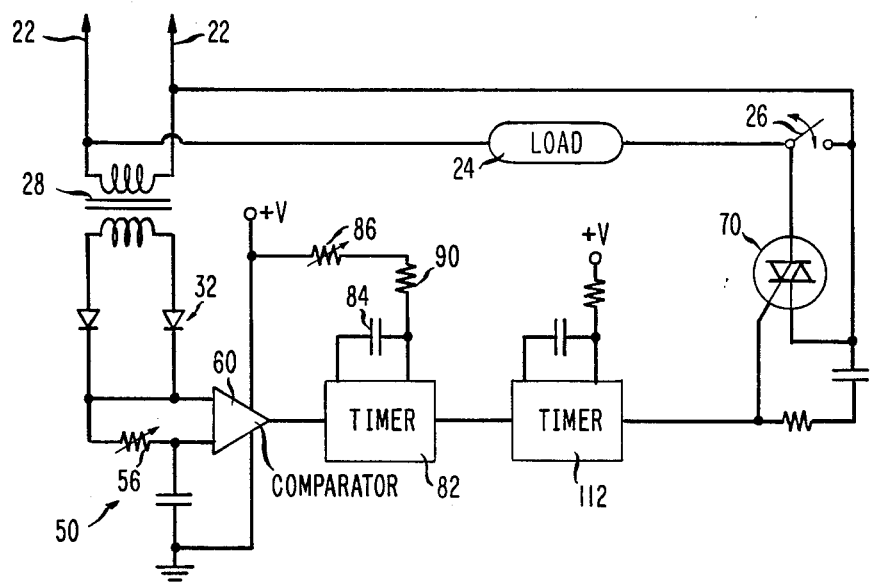
FIG. 7 is a schematic diagram illustrating an alternative embodiment of the invention.

A simplified alternative embodiment of the invention is shown in FIG. 7. This embodiment is similar to that of FIG. 1, however, the same full wave rectifier 32 is used to produce both inputs to comparator 60. One input is connected to the raw full wave rectified output from rectifier 32 and the other is connected thereto through a low pass filter 50, including a series resistor and parallel capacitor. In FIG. 7, the series resistor 56 applied to the second input to comparator 60 is variable, thereby allowing the user to adjust the level at which comparator 60 will be triggered. This is another method of adjusting the phase delay, and results in comparator 60 changing state earlier or later after the zero crossing on the AC power line as defined by the full wave rectified signal crossing the set threshold. Accordingly, comparator 60 will be sensitive to a voltage occurring somewhere between the maximum and minimum of the full wave rectified signal. Should the comparator 60 be arranged to trigger at a later point after a zero crossing, then the time value for timer 82 can be reduced accordingly.

In FIG. 7, timer 82 is provided with a timing network including a capacitor and two resistors through which the capacitor is charged to determine the pulse width of the timer. A fixed resistor 90 together with a variable resistor 86 is provided. Fixed resistor 90 can be of an appropriate value together with the timing capacitor 84 such that when variable resistor 86 is zero, the delay between triggering of timer 82 and timing out of timer 82 is exactly long enough to coincide with the next successive zero crossing. Accordingly, comparator 60 senses a zero crossing (or other threshold level) during one half cycle, and uses this to trigger a pulse from timer 112 during a next or succeeding one of the half cycles.

Figure 6:
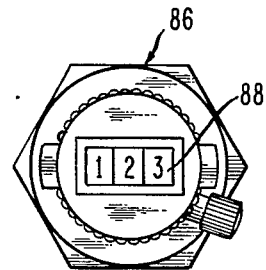
FIG. 6 is a plan view of a phase delay controlling potentiometer according to the invention.

Potentiometer 86 may be a precision multi-turn potentiometer, as show in FIG. 6. Preferably, a numeric indicator 88 is provided. The user can precisely set the desired level using the precision potentiometer. Preferably, the resistance of potentiometer 86 is arranged such that over its span from 000 to 999, the resulting delay varies from 0 to a complete half cycle on the power line.

FIG. 8 illustrates specific preferred circuit design according to the invention, including specific component identifications. In this embodiment, in addition to the means discussed above, the components are arranged to show which are included on the same circuit card and which are external to the circuit card, packaged in the unit. Switch 160 is provided for changing the windings on transformer 28 to accommodate different voltage levels, for example, 120 or 240 volts AC. Red and green LED indicators 162, 164 reflect the outputs of the pulse timers, and the extent of their illumination generally reflects the proportionate power control setting at the time. A fuse 166 is preferably included on the supply side of transformer 28, for safety purposes. A lamp 168 can be provided to show the "on" state of the incoming power, or to likewise reflect application of power to the load 24, lamp 168 being in that case connected parallel to load 24.

The elements external to the printed circuit card are placed externally such that they will be accessible or visible on an external housing, or with respect to triac 70, so that the triac can be mounted to a heat sink. The other elements of the circuit do not dissipate a great deal of current, and stay moderately cool during operation.

The apparatus is preferably mounted in a heavy duty junction box of the same type used for circuit breakers at the service supply panel. This junction box can be immediately associated with a breaker box (e.g., mounted next to it) and wired such that circuits in the establishment leading to the lighting equipment are controlled by the apparatus. The housing can be an indoor/outdoor enclosure, sealed such that dirt, dust, oil, rain, moisture and dripping water are excluded. By the variable electronic control of the invention, power consumption of the lighting circuits is reduced for lighting loads. The electronic control is especially useful for flourescent lighting, including lamps and ballasts for mercury and metal halide lamps, high or low pressure sodium lamps, other flourescent lamps, mercury vapor lamps, etc. The apparatus is preferably configured to control a number of such lamps. The preferred commercial models, for example, are configured for 120/240/480 Volts AC, and 50 or 100 Amps (46 KW or 96 KW).

A number of further embodiments and improvements are possible and will now be apparent to persons of ordinary skill. The invention, which includes many such modifications and improvements, is characterized as a power controller operable to connect a load 24 to a source 22 of periodically varying electric power for a user-selected interval during each cycle thereof. The power controller has at least one full wave rectifier 32, 40 connectable to power from the source 22, 28, the full wave rectifier 34 producing an unfiltered output signal "III" varying between zero and a predetermined peak. A low pass filter 50 is connected to the at least one full wave rectifier 32. The low pass filter is connected to the at least one full wave rectifier 34, the low pass filter 50 having an output voltage "IV" substantially equal to a predetermined DC voltage, the output signal of the full wave rectifier 32 varying periodically to cross said DC voltage at regular times during each cycle of the periodically varying power. A comparator 60 is operable to compare the unfiltered output signal III and the output voltage IV of the low pass filter 50, to sense said regular times. Switch means 70 are responsive to an output of comparator 60, the switch means 70 connecting the source 22 and the load 24 during a predetermined portion of the cycle beginning or ending at a time defined by the output of the comparator 60. Means 86, 82 are included for varying one of the beginning and the ending. .

A timer 82 is preferably responsive to the output of the comparator 60, whereby one of the beginning and ending is defined by the timer 82 timing out, the other of the beginning and the ending is defined by a zero crossing on the AC signal. The switch means preferably comprises a thyristor 70, whereby the switch means once triggered remains operable to connect the source 22 to the load 24 until a reversal of polarity of the electric power. Timer 82 preferably begins timing at a reversal of polarity (i.e., a zero crossing) of the electric power and the switch means 70 is triggered when the timer 82 times out. The means for varying one of the beginning and ending of the triggering cycle preferably includes a manually variable potentiometer 86, which can be connected in an RC circuit 84, 86 at an input to the timer 82 defining a timer interval length between zero crossing and a triggering of the switching means 70. A potentiometer may be connected to an input to the comparator 60, for adjusting a relative proportion of one of the unfiltered output of the full wave rectifier and the output signal of the low pass filter, thereby adjusting the initiation of timing by a timer 82.

Preferably, the potentiometer is a multi-turn precision potentiometer, including a numerical digital indicator 88. The timer interval can be greater than an interval of a half cycle of the source, whereby the timer is triggered in a first half cycle and times out in a later half cycle. The device is applicable to power sources of alternating current electric power, for example at standard frequencies of 50, 60 and 440 hertz. The source may be alternating current domestic electric power at one of 110 220, 440 volts AC (120/240/480), or at other power levels. Preferably, the device is mounted in a housing and additional power controllers may be included in the housing for controlling additional loads. In this connection, the power controllers may control loads at different voltages.

The invention having been disclosed, other embodiments will now become apparent to persons skilled in the art. Reference should be made to the appended claims rather than the foregoing specification as indicating the true scope of the invention.

I claim:

1. A power controller operable to connect to a load a source of periodically varying electric power for a user-selected interval during each cycle thereof, comprising:
   at least one full wave rectifier connectable to the source, the full wave rectifier producing an unfiltered output signal varying between zero and a predetermined peak;
   a low pass filter connected to one said at least one full wave rectifier, the low pass filter having an output voltage substantially equal to a predetermined DC voltage, the output signal of the full wave rectifier varying periodically to cross said DC voltage at regular times during each cycle of the periodically varying power;
   a comparator operable to compare the unfiltered output signal and the output voltage of the low pass filter, to sense said regular times;
   switch means responsive to an output of the comparator, the switch means connecting the source and the load during a predetermined portion of said cycle beginning or ending at a time defined by the output of the comparator; and,
   means for varying one of the beginning and the ending.

2. The power controller of claim 1, further comprising a timer responsive to the output of the comparator, and wherein said one of the beginning and the ending is defined by the timer timing out, the other of said beginning and the ending being defined by the unfiltered output signal of the full wave rectifier reaching zero.

3. The power controller of claim 2, wherein the switch means comprises a thyristor, whereby the switch means once triggered remains effective to connect the source to the load until a reversal of polarity of the electric power.

4. The power controller of claim 3, wherein the timer begins timing at a reversal of polarity of the electric power and the switch means is triggered by the timer timing out.

5. The power controller of claim 2, wherein the timer begins timing at a reversal of polarity of the electric power and the switch means is triggered by the timer timing out.

6. The power controller of claim 2, wherein the timer interval is greater than an interval of a half cycle of the source, whereby the timer is triggered in a first half cycle and times out in a later half cycle.

7. The power controller of claim 2, wherein the timer interval is greater than a full cycle of the source.

8. The power controller of claim 1, wherein the means for varying said one of the beginning and the ending includes a manually variable potentiometer.

9. The power controller of claim 8, wherein the potentiometer is a multi-turn precision potentiometer.

10. The power controller of claim 9, further comprising a numerical digital indicator on the potentiometer, for showing the setting thereof.

11. The power controller of claim 8, wherein the potentiometer is connected in an RC circuit at an input to the timer defining a timer interval length.

12. The power controller of claim 8, wherein the potentiometer is connected to an input to the comparator, for adjusting a relative proportion of one of the unfiltered output of the full wave rectifier and the output signal of the low pass filter applied to the inputs of the comparator.

13. The power controller of claim 1, wherein the power source is alternating current electric power at one of 50, 60 and 440 Hertz.

14. The power controller of claim 13, wherein the power source is alternating current domestic electric power at one of 110, 220 and 440 Volts AC, and further comprising a transformer and means for selecting primary windings of the transformer, secondary windings of the transformer being connected to the at least one full waver rectifier.

15. The power controller of claim 1, further comprising a housing and at least one additional power controller for controlling a second load.

16. The power controller of claim 15, wherein the second load is controlled from a different voltage source.

17. A power controller operable to connect to a load a source of periodically varying electric power for a user-selected interval during each cycle thereof, comprising:
   two full wave rectifiers connectable to the source, a first of the full wave rectifiers producing an unfiltered output signal varying between zero and a predetermined peak;
   a low pass filter connected to a second of said two full wave rectifiers, the low pass filter having an output voltage substantially equal to a predetermined DC voltage, the output signal of the first full wave rectifier varying periodically to cross said DC voltage at regular times during each cycle of the periodically varying power;
   a comparator operable to compare the output signals of the first and second full wave rectifiers via the unfiltered output signal and the output voltage of the low pass filter, thereby sensing regular times during successive cycles of the periodically varying electric power;
   switch means responsive to an output of the comparator, the switch means connecting the source and the load during a predetermined portion of said cycle beginning or ending at a time defined by the output of the comparator;

a timer responsive to the output of the comparator, the switch means comprising a thyristor, whereby the switch means once triggered remains effective to connect the source to the load until a reversal of polarity of the electric power and wherein said one of the beginning and the ending is defined by the timer timing out, the other of said beginning and the ending being defined by the unfiltered output signal of the full wave rectifier reaching zero and, a manually settable potentiometer for varying one of the beginning and the ending of the interval, the potentiometer being a multi-turn precision potentiometer having a numeric readout showing a setting thereof.

* * * * *